United States Patent [19]

Willmore

[11] 3,897,686
[45] Aug. 5, 1975

[54] SPRING SUSPENSION FOR MEASURING INSTRUMENTS

[75] Inventor: Patrick Lever Willmore, Edinburgh, Scotland

[73] Assignee: The Rank Organisation Limited, London, England

[22] Filed: Aug. 27, 1973

[21] Appl. No.: 391,124

[30] Foreign Application Priority Data
Aug. 25, 1972 United Kingdom............... 39775/72
Mar. 7, 1973 United Kingdom............... 11021/73

[52] U.S. Cl................................... 73/382; 267/158
[51] Int. Cl............................ G01v 7/00; F16f 1/18
[58] Field of Search .......... 73/382, 432 A; 267/158, 267/160

[56] References Cited
UNITED STATES PATENTS
2,744,748   5/1956   Wiegers et al...................... 267/158
2,772,086   11/1956  Foster................................ 267/158
3,122,023   2/1964   Gledhill ............................. 73/490

OTHER PUBLICATIONS

"The Theorey and Design of Long–Deflection Constant–Force Spring Elements" by Votta – Transactions of the ASME, May 19, 1952, pp. 439–50.

Primary Examiner—James J. Gill
Attorney, Agent, or Firm—Brisebois & Kruger

[57] ABSTRACT

A suspension device for connecting two relatively movable members in which relative movement of the two members in a given direction is opposed by a substantially constant restoring force. The suspension device comprises a rigid beam pivoted at one end to one of the relatively movable members and connected rigidly at the other end to one end of a curved spring the other end of which is attached to the other of the relatively movable members with the spring stressed to a straightened position.

9 Claims, 5 Drawing Figures

PATENTED AUG 5 1975                                     3,897,686

SHEET 2

SPRING SUSPENSION FOR MEASURING INSTRUMENTS

The present invention relates to suspension devices, and particularly to a resilient suspension device which can be arranged such that the restoring force applied as a result of displacements of the system from a normal position, at least in one direction, are substantially independent of the magnitude of the displacements, within a given range.

As is well known, in normal spring arrangements the restoring force applied by a spring is related to the magnitude of the deflection of the spring from a normal or natural position, increasing with an increase in the deflection of the spring; however, for many mechanical devices, in particular vertical seismographs and gravity meters, it is necessary to provide a suspension system for which at least the lifting force on a movable element of the device is substantially independent of the position of the element. In practice it is difficult to provide a system in which the lifting force is entirely independent of the position although a useful approximation of this can be achieved. One prior device which provides this type of suspension is the "La Coste" suspension which makes use of a spring termed a "zero-length spring" to support the end of a lever which is pivoted so as to be free to rotate in a vertical plane. However, for many applications there is only a restricted space available for the suspension system and zero-length springs are bulky and occupy considerable space.

In addition zero-length springs are difficult to construct; in one attempt to avoid the requirement for a zero-length spring a triangular leaf spring, connected by a taut wire to the end of the lever, was substituted for the zero-length coil spring. This system, however, was not entirely satisfactory.

According to the present invention a suspension device for coupling two relatively movable members comprises an elongate rigid element pivotably attachable at one end to one of the relatively movable members, and an elongate curved resilient element rigidly attached at one end to the other end of the rigid element and pivotably attachable at the other end to the other of the relatively movable members such that relative movement of the two relatively movable members induces simultaneous flexure of the said resilient element and rotation of the said rigid element.

The rotation of the rigid element thus compensates the increase in restoring force due to the displacement of the other end of the resilient element by moving the said one end a certain amount. Preferably, the curved resilient element is a triangular leaf spring and the curvature of the resilient element when relaxed in its natural or unstressed shape is an arc of a circle.

Similarly, it is preferred that the tangent to the curved resilient element extends transverse the rigid element at the point where the said one end of the resilient element is connected to the other end of the rigid element. Since the natural shape of the resilient element is curved, the whole of the resilient element will only be perpendicular to the rigid element when the resilient element is stressed in such a way that it is straightened.

In order to achieve a suspension system in which the restoring force is substantially independent of the displacement of the relatively movable members the resilient element is stressed to a substantially straight shape when the suspension system is being assembled. This is suitable for arrangements in which the two relatively movable members are constrained for relative movement along a straight line, but if this is not the case it is preferable that at least two suspension devices as described above are utilised since the straightening of the resilient element will naturally apply a transverse force between the two relatively movable members; even if the two relatively movable members are constrained for relative movement along a straight line it is useful to use two such suspension devices since by counterposing the suspension devices in a suitable configuration the transverse forces applied by the resilient elements can be cancelled and the frictional forces between the members thereby reduced.

It has been found, and can be shown, that in the optimum configuration for a suspension system incorporating suspension devices as described above to provide the required constant restoring force, the natural shape of the resilient element or elements should be an arc of a circle the diameter of which is substantially equal to the length of the pivoted rigid element.

The present invention also comprehends a mechanical device such as a vertical seismometer, of the type having a cylindrical mass constrained to move along the axis of a cylindrical container, in which the mass is mounted in the container by means of a suspension system incorporating at least two suspension devices as described above.

In a preferred embodiment, the rigid elements are pivoted to respective diametrically opposed points on one of the relatively movable members and are each provided with two substantially indentical resilient elements side by side. One embodiment of the present invention will now be more particularly described, by way of example, with reference to the accompanying drawings, in which.

Figure 1:
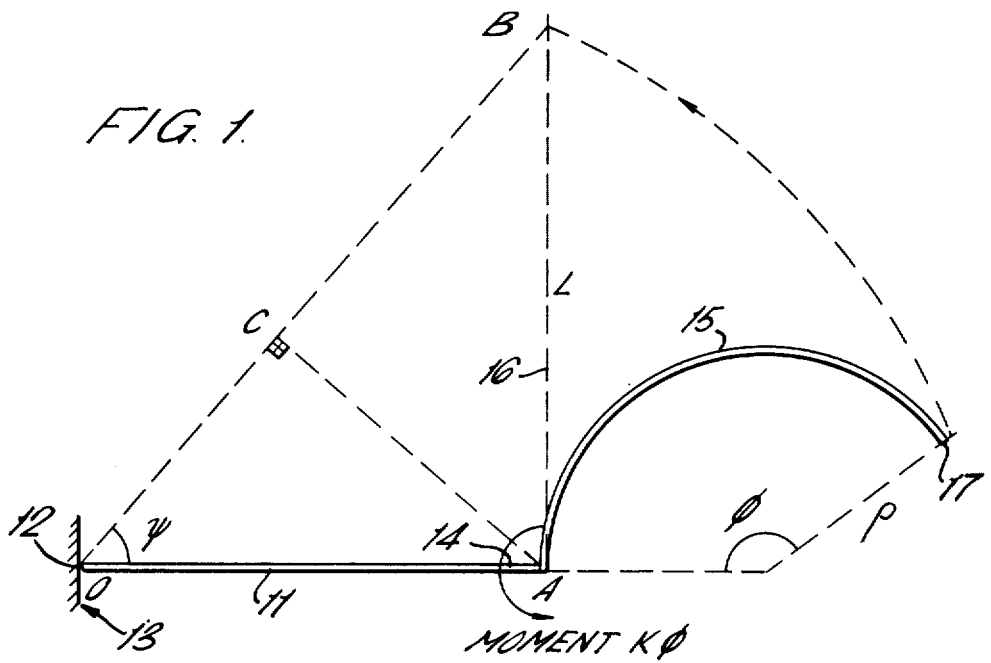
FIG. 1 is a diagrammatic illustration of a single suspension device formed as an embodiment of the present invention, showing the device in its natural or unstressed position.

Referring now to FIG. 1 the suspension device comprises a rigid element 11 which is pivoted at one end 12 to a member generally indicated 13. The other end 14 of the lever 11 is rigidly secured to an arcuate triangular leaf spring 15, the connected ends of the lever 11 and the leaf spring 15 being perpendicular to one another. The radius of curvature $\rho$ of the leaf spring 15 will be shown below to be ideally half the length L of the lever 11.

When assembled between two relatively movable members, of which the member 13 is one, the leaf spring 15 is displaced to a position shown by the broken line 16 where the free end 17 of the leaf spring 15 occupies the position B illustrated in FIG. 1. In a convenient working position the lever 11 is substantially horizontal and the position B of the tip of the leaf spring 15 is vertically above the end 14 of the lever 11. The initially curved leaf spring is distorted into a substantially uniformly stressed plane by the horizontal component of the force applied between the two relatively movable members which maintains the tip 17 of the leaf spring 15 at the position B. The bending movement at the root of the spring, that is the end where it is connected to the end 14 of the lever 11, tends to rotate the lever about its pivot at 12, thus producing a vertical reaction along the plane of the spring. This force supports the other of the movable members when the suspension device is assembled thereto.

Figure 2:
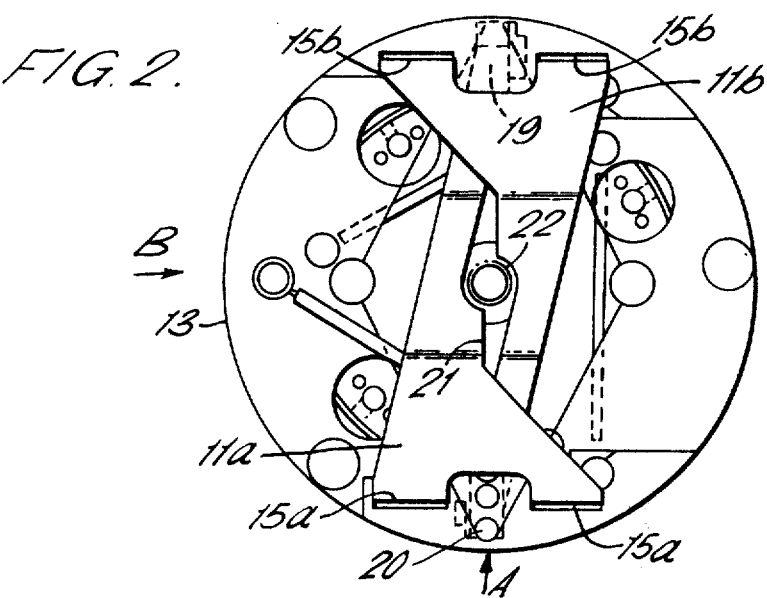
FIG. 2 is a plan view of a mechanical device incorporating the embodiment of FIG. 1.
Figure 3:
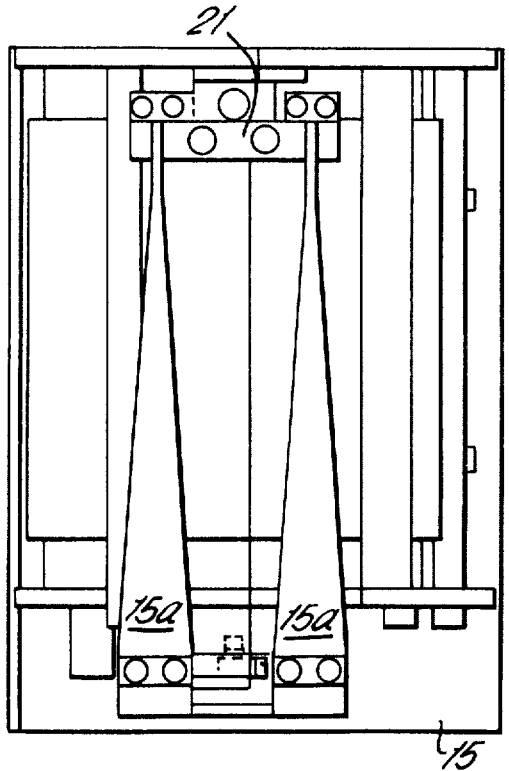
FIG. 3 is a side view of the device illustrated in FIG. 2, as seen from the direction of the arrow A of FIG. 2.
Figure 4:
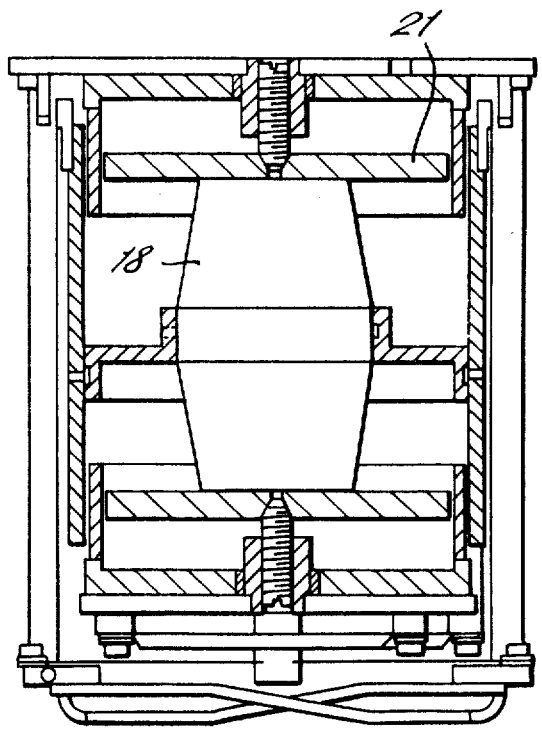
FIG. 4 is a partially sectioned side view of the device illustrated in FIG. 2 as seen from the direction of the arrow B of FIG. 2.

Referring now to FIGS. 2, 3 and 4 there is shown a mechanical device incorporating the suspension device illustrated in FIG. 1. The member 13 is formed, in this device, by a supporting framework with respect to which a mass 18 is movable, but supported by the suspension system. The suspension system comprises two devices of the type described in FIG. 1 diametrically opposed on respective sides of the framework 13.

Two levers 11a and 11b are pivotally mounted by their end 19 and 20 respectively to the framework 13, and the other ends of the levers 11a and 11b are connected to pairs of triangular leaf springs 15a and 15b.

Each of the levers 11 widens from the pivoted end 19, 20 to the end supporting the springs 15 and the adjacent edges are notched at 21 and 22 respectively such that the hinges of the levers 11 can be at the same level without pivotal movement of the levers 11 about their respective hinges interfering with one another. The tips 17 of the springs 15 are coupled to a support framework 21 from which the weight 18 is suspended.

If the shape and position of the springs 15 with respect to the length of the levers 11 is optimised, as will be discussed below, the restoring force applied to the mass 18 when it is displaced from the rest position will be substantially constant for at least a range of displacements from the rest position. This is particularly convenient for scientific instruments such as gravity meters and seismographs.

Figure 5:
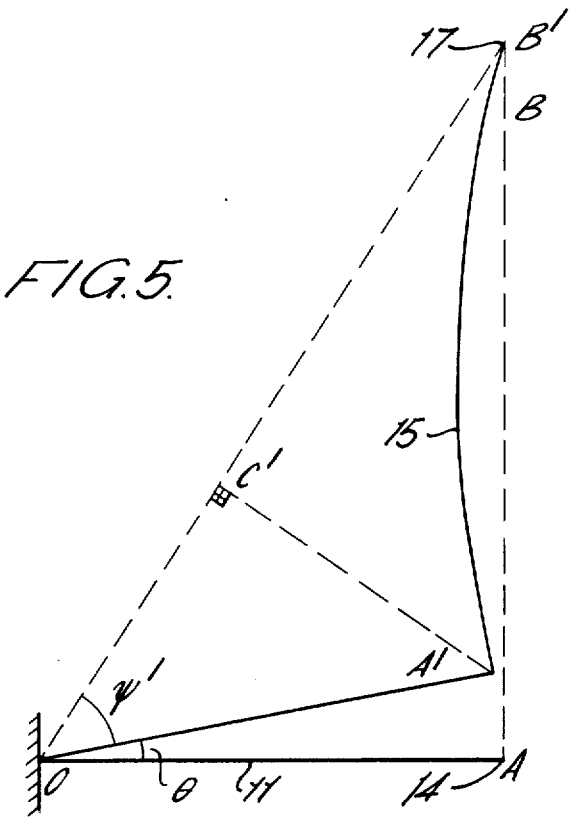
FIG. 5 is a diagrammatic illustration of a suspension device formed as an embodiment of the invention, illustrating the device in two operating positions.

Referring now to FIG. 5 in which the suspension device illustrated in FIG. 1 is shown in two different operating positions, it will be seen that the end 14 of the lever 11 occupies the position indicated A when the mass 18 is at rest. In this position the free end 17 of the springs 15 occupies the position indicated by the reference B. In this position the spring 15 is substantially perpendicular to the lever 11. This position is also indicated in broken outline in FIG. 1 for the sake of clarity. The angle subtended by the point B from the end 12 of the lever 11 is denoted $\psi$ and the position of the pivoted end 12 of the lever 11 is denoted 0. The perpendicular from the point A to the line 0B is denoted C, and the length of the spring 15 is denoted L.

In the position shown in FIG. 5 the lever 11 is shown displaced by an angle $\theta$ above the rest position, and in this position the end 14 of the lever 11 occupies a position A′ and the tip 17 of the spring 15 occupies the position B′. The perpendicular from the point A′ to the line 0B′ is denoted C′, and the angle subtended at the point 0 by the lever 11 with respect to the line 0B′ is denoted $\psi'$.

To determine the optimum length L of the spring 15 it will be considered to be the arc of a circle of radius $\rho$ which subtends an angle $\phi$ at the centre. By allowing the lever 11 to rise through an angle $\theta$ it will be noted that an angle $2\theta$ has been introduced between the ends of the spring 15. Because the restoring force is required to be independent of the displacement, the suspension device must apply the same force to the mass when the tip 17 of the spring is at the position B′ as it did when the tip 17 of the spring was in the position B so that there must be no resultant moment above the point 0. In this case the resultant forces at the spring tip must lie along the lines 0B in the initial position and 0B′ in the displaced position.

Taking moments about the point A, A′ gives $F \cdot AC = K \cdot \psi$ $F' \cdot A'C' = K (\phi - 2\theta)$ where $F$ represents the force along the line 0B, and $F'$ represents the force along the line 0B′.

The vertical component of the force acting at $B = F \sin \psi$.

The vertical component of the force acting at $B' = F' \sin (\psi + \theta)$.

The condition for constant lift is $$F \sin \psi = F' \sin (\psi + \theta)$$

i.e.

$$\sin K\phi/AC = \sin (\psi + \theta) K (\phi - 2\theta) / A'C' \qquad (1)$$

Now, $\sin \psi = AC/l$, $\sin \psi = A'C'/l$

So that equation (1) becomes $$K\phi/l = \frac{\sin (\psi + \theta) \cdot K(\phi - 2\theta)}{l \sin}$$

which, to the first order in $\theta$, reduces to $$K\phi/l = K/l (\phi + \frac{l\theta\phi}{L} - 2\theta),$$

or $$l\phi = 2 L.$$

but $$\phi = L\pi,$$

(where $\pi$ is the initial radius of curvature of the spring), so that $$\pi = \frac{1}{2}.$$

I claim:

1. A suspension device for coupling two relatively movable members comprising:
   an elongate rigid element
   pivotal attachment means for pivotally attaching one end of said elongate rigid element to a first one of said two relatively movable members
   at least one elongate resilient element which is curved in the unstressed state
   means rigidly attaching one end of said at least one elongate curved resilient element to the other end of said elongate rigid element,
   pivotal attachment means for pivotally attaching the other end of said at least one elongate curved resilient element to a second one of said two relatively movable members, and means for constraining the said two relatively movable members to move in a predetermined path which is such that the path of relative movement of said pivotal attachment means at said one end of said rigid element with respect to said pivotal attachment means at said other end of said resilient element does not intersect said pivotal attachment means at said other end of said resilient element.

2. The suspension device of claim 1 wherein said rigid attachment means attaching said one end of said elongate curved resilient element to said other end of said elongate rigid element hold said elongate curved resilient element with the tangent thereto at the point of connection with said elongate rigid element transverse said elongate rigid element.

3. The suspension device of claim 2 wherein said rigid attachment means hold said elongate curved resilient element with the tangent thereto at the point of connection with said elongate rigid element, substantially perpendicular to said elongate rigid element.

4. The suspension device of claim 1 wherein said elongate curved resilient element has a curvature in the unstressed state of the arc of a circle.

5. The suspension device of claim 4 wherein the diameter of said circle of which said elongate curved resilient element forms an arc has a diameter substantially equal to the length of said elongate rigid element.

6. The suspension device of claim 1 wherein said elongate curved resilient element is a substantially triangular leaf spring.

7. A suspension system incorporating two relatively movable members, and the suspension device of claim 1, wherein
said elongate curved resilient element is stressed to a straightened position upon assembly of said suspension device into said suspension system.

8. A suspension system for coupling two relatively movable members comprising:

means for constraining said two relatively movable members for substantially rectilinear relative movement in a given direction,
two rigid beams,
means pivotally connecting one end of each said rigid beam to a first one of said two relatively movable members such that said rigid beams extend in respective opposite directions from one another from said one ends thereof,
at least two elongate resilient elements which are curved in the unstressed state,
means rigidly attaching one end of each of said resilient elements to the other end of a respective one of said two rigid beams, and
attachment means securing the other ends of said two resilient elements to opposite sides of a second one of said two relatively movable members, whereby said two resilient elements are stressed in opposite directions and apply substantially equal and opposite forces between said relatively movable members transverse the direction in which said relatively movable members are constrained to move.

9. A vertical seismometer of the type having a cylindrical mass constrained to move along the axis of a cylindrical container, wherein said mass is mounted in said container by a suspension system according to claim 8, said cylindrical container constituting said first relatively movable member on opposite sides of which said two rigid beams are pivoted and said cylindrical mass constituting said second relatively movable member on opposite sides of which said resilient elements are connected, the resilient element connected to each rigid beam being connected to said cylindrical mass on the side thereof remote from the side on which the associated rigid beam is connected to said cylindrical container.

* * * * *